United States Patent [19]

Jones

[11] 4,274,299
[45] Jun. 23, 1981

[54] COLLAPSIBLE STEERING COLUMN
[75] Inventor: Bryan Jones, Chelmsford, England
[73] Assignee: Ford Motor Company, Dearborn, Mich.
[21] Appl. No.: 973,279
[22] Filed: Dec. 26, 1978
[30] Foreign Application Priority Data
   Feb. 4, 1978 [GB] United Kingdom ................ 4560/78
[51] Int. Cl.³ .............................................. B62D 1/16
[52] U.S. Cl. .................................... 74/492; 188/1 C
[58] Field of Search ................ 74/492, 493; 64/11 B, 64/32; 403/50, 109; 180/79; 188/1 C

[56] References Cited
U.S. PATENT DOCUMENTS

| | | | |
|---|---|---|---|
| 2,272,900 | 2/1942 | Saurer | 74/492 |
| 3,016,764 | 1/1962 | Fredericks | 74/552 |
| 3,262,332 | 7/1966 | Wight | 188/1 C |
| 3,401,576 | 9/1968 | Eckels | 74/493 |
| 3,504,568 | 4/1970 | Nakamura et al. | 188/1 C |
| 3,508,633 | 4/1970 | Nishimura et al. | 74/493 |
| 3,754,411 | 8/1973 | Orain | 74/493 |
| 3,805,636 | 4/1974 | Howes | 74/492 |
| 3,850,049 | 11/1974 | Adams et al. | 74/492 |
| 3,864,988 | 2/1975 | Adams | 74/492 |
| 3,922,928 | 12/1975 | Kester | 74/492 |

FOREIGN PATENT DOCUMENTS

| | | |
|---|---|---|
| 1303280 | 6/1971 | Fed. Rep. of Germany . |
| 932027 | 7/1963 | United Kingdom . |
| 1148469 | 4/1969 | United Kingdom . |

Primary Examiner—Dave W. Arola
Attorney, Agent, or Firm—Steven L. Permut; Clifford L. Sadler

[57] ABSTRACT

A steering column has an upper column section and a lower column section with an intermediate collapsible tubular member in torque transmitting engagement with the upper and lower column sections. Each column section has an end telescoping into the tubular collapsible member. Each end is square in cross-section with one end having a slightly larger cross-sectional area than the other such that the smaller one is received therein and prevents free relative rotation of the two column sections if the collapsible member is ruptured.

2 Claims, 2 Drawing Figures

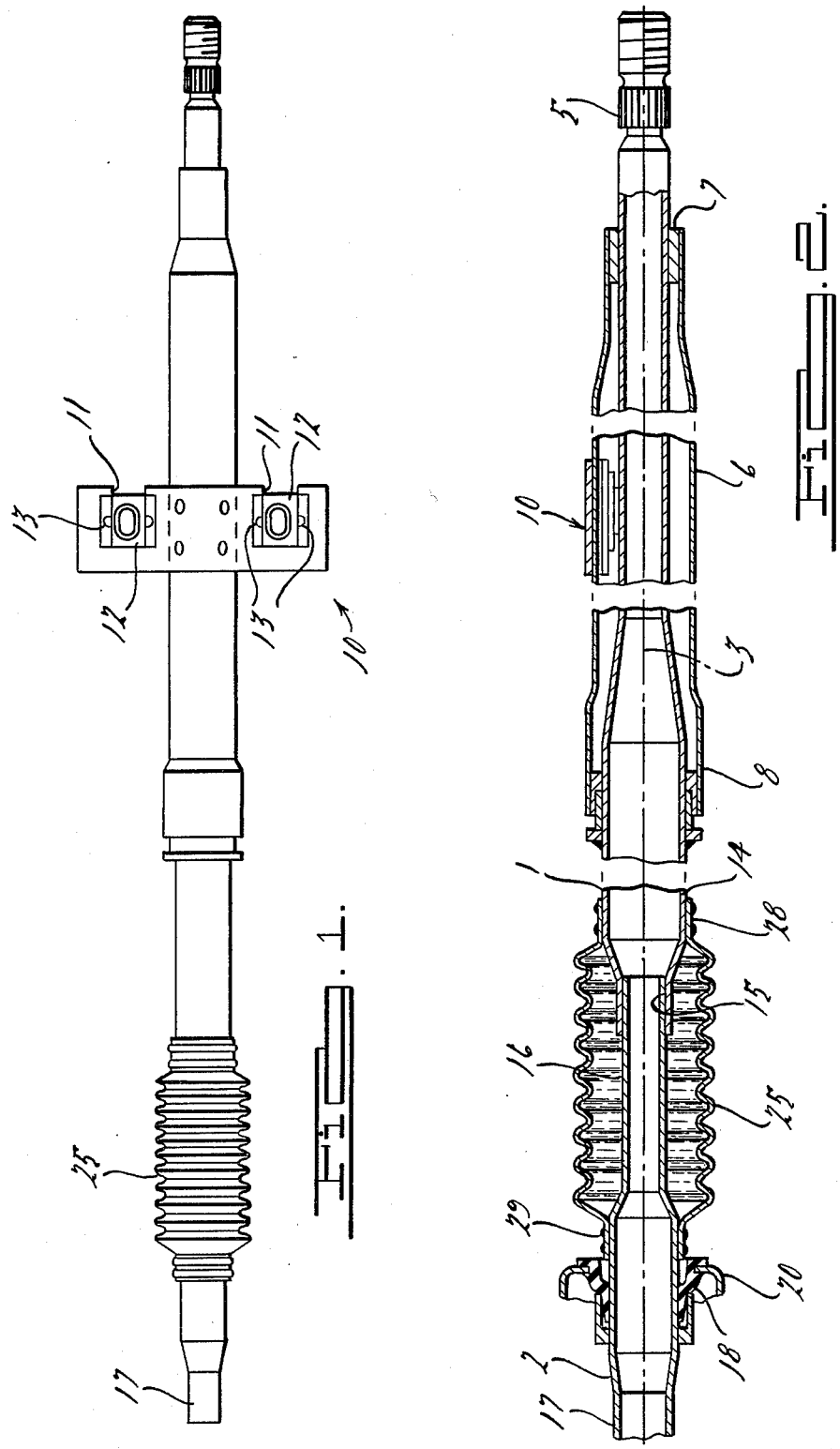

COLLAPSIBLE STEERING COLUMN

BACKGROUND OF THE INVENTION

1. Field of the Invention

This invention relates to collapsible steering columns for motor vehicles.

2. Description of the Prior Art

In one conventional collapsible steering column, the column is composed of two steering shaft sections extending coaxially along the length of the column and an axially deformable member connected to each steering shaft section for transmitting torque from one section to the other but which collapses under axial impact loads.

In such columns, the deformable member is usually a thin-walled tubular member having corrugations and/or perforations which allow the member to compress under axial loads. One such device is disclosed in German Pat. No. 1,303,280 assigned to Daimler Benz.

Another device which shows a corrugated torque transmitting member located between the steering wheel and the upper end of the steering shaft is disclosed in U.S. Pat. No. 3,016,764 issued to Fredericks et al on Jan. 16, 1962.

SUMMARY OF THE DISCLOSURE

According to the present disclosure, a steering column for a motor vehicle comprising a tubular housing which rotatably supports upper and lower steering shaft column. A collapsible tubular member interconnects the two steering shaft sections for transmitting torque between them. The collapsible member is axially deformable under impact loads applied to either of the steering shaft. In addition to being interconnected by the collapsible member, the ends of the two steering shaft sections are telescopically connected. The end of one shaft section defines an axial guide for the end of the other shaft section when the two shaft sections are displaced relative to each other under an impact load. The telescopic ends are shaped to prevent substantial relative rotation of the two column sections.

With this construction, the relative movement of the ends of the two steering shaft sections is guided in the axial direction under impact thus ensuring that impact loads effect only compression of the column and not bending. The steering shaft assembly is capable of transmitting steering torque from the steering wheel to the steering gear through the telescopic connector regardless of any deformation of the deformable member.

Any suitable construction may be adopted for the telescopic ends of the steering shaft sections. Preferably, however, the one end is of non-circular (e.g., square or hexagonal) cross-section and is telescopically received within a recess of similar non-circular cross-section in the other end.

During normal operation steering torque is transmitted from one shaft section to the other through the deformable member. It is desirable that the connection between the two ends of the shaft sections allow limited relative rotation or "play" between the two shaft sections at their telescopic interconnection.

In the event the driver senses this "play" when turning the steering wheel, he will thereby be advised that the deformable member is not operating in its intended fashion.

BRIEF DESCRIPTION OF THE DRAWINGS

A preferred steering column in accordance with the invention will now be described, by way of example only, with reference to the accompanying drawings in which:

FIG. 1 is a plan view of the steering column, and

FIG. 2 is a cross-sectional, enlarged, and fragmented side view of the steering column.

DETAILED DESCRIPTION OF THE DRAWINGS

Referring to the drawings, a steering column assembly is illustrated which comprises lower and upper tubular steering shaft sections, 1, 2, arranged coaxially along the axis 3 of the column. The steering shaft sections are interconnected as will be described and are constructed to transmit steering torque from a steering wheel to a steering gear.

The upper shaft section 1 carries splines 5 at one end on which a steering wheel (not shown) may be mounted. The first shaft section 1 is rotatably mounted in a tubular jacket 6 by means of thrust bearings 7 and 8. The jacket 6 carries a mounting bracket 10 which defines two opened slots 11. A mounting block 12, is slidably mounted in each slot 11 and is prevented from removal therefrom by means of sherable projections 13. The bracket 10 may be secured to a vehicle dashboard or instrument panels (not shown) by means of bolts which pass through the mounting blocks, 12.

The lower end 14 of the upper shaft section 1 defines a recess 15 of square cross-section which telescopically receives the upper end 16 of the lower steering shaft section 2, also of square cross-section. The end 16 of the second lower shaft section 2 has a clearance fit in the recess 15 in the end of the upper steering shaft section 1. The lower shaft section 2 terminates in a lower end portion 17 of triangular cross-section by means of which the shaft section 2 can be connected to a steering box or gear (not shown). A bearing 18 is provided on the lower shaft section 2 to allow it to be rotatably mounted in a firewall of a vehicle, as indicated at 20.

The telescopically engaging ends of the two shaft sections 1, 2 are connected by a deformable member 25 which, in the embodiment illustrated, is a corrugated metal tube. The corrugated tube 25 is connected by welds 28, 29 to the two shaft sections 1 and 2 and encloses the ends 14 and 16 of the shaft sections.

Operation

In normal use, torque applied to the upper shaft section 1 of the column by the driver of the vehicle is transmitted to the lower steering shaft section 2 through the tube 25. In the event of a failure of the tube 25, for example as a result of a rupture of the walls of the tube or a fracture of the welds 28, 29, the non-circular cross-section telescopic connection between the telescopic ends 14, 16 of the two shaft sections 1 and 2 prevents free relative rotation of the shaft sections and, therefore, allows the driver to retain full steering control of the vehicle. The driver will detect play in the steering shaft assembly and the condition of the steering system.

An impact load applied to the lower shaft section 2 will cause the tube 25 to compress, thus allowing the second shaft section 2 to move rearwardly towards the first shaft section. The upper steering shaft section 1, being supported by thrust bearings 7 and 8 seated in the housing 6, resists such rearward movement. The recess 15 in shaft section 1 acts as an axial guide for the end 16 of the second shaft; section 2 so that the relative telescopic movement of the two sections 1 and 2 is confined to the axial direction. As a result, the collapse of the tube 25 occurs under the minimum load, thus ensuring that a minimum force transmitted to the first shaft section 1.

In the event of a forwardly directed impact load upon the steering wheel, the load applied to the first steering shaft section 1 is initially transferred to the jacket 6 via the thrust bearings 7 and 8. If the force of the impact is sufficiently high the projections 13 will shear away from the mounting blocks, transferring the load to the tube 25. The tube 25 then collapses and allows the first shaft section 1 and the jacket 6 to move axially towards the second shaft 2 of the column. The relative movement of the tubes is guided by the telescopic movement of the two ends 15, 16 of the shaft sections. This ensures that the two shaft sections are retained in axial alignment and that the column collapses in the designed manner.

Variations and modifications of the present invention are possible without departing from its scope and spirit as defined by the appended claims.

I claim:

1. A steering column for a motor vehicle comprising:
a first and second steering shaft sections extending coaxially along the length of said column;
a member interconnecting said shaft sections constructed to transmit stearing torque between them;
said member being axially deformable under an axially directed impact load applied to either of said shaft sections;
said first shaft section having an end telescopically received in one end of the second shaft section;
said telescopically interconnected ends being constructed to function as an axial guide for relative movement of said shaft sections under impact causing the collapse of said member;
one of said ends of said first shaft section being of non-circular cross section and being telescopically received with a recess of similar non-circular cross section in the receiving end of the second shaft section wherein the receiving end forms a clearance fit with respect to the said one end of the first shaft section to allow limited relative rotation between the two shaft sections when the torque transmitting deformable member does not transmit torque from one shaft section to the other section, said limited relative rotation being noticeable to an operator of a motor vehicle.

2. A steering column for a motor vehicle comprising:
first and second steering shaft sections extending coaxially along the length of said column;
a member interconnecting said shaft sections constructed to transmit steering torque between them;
said member being axially deformable under an axially directed impact load applied to either of said shaft sections;
said first shaft section having an end telescopically received in one end of the second shaft section;
said telescopically interconnected ends being constructed to function as an axial guide for relative movement of said shaft sections under impact causing the collapse of said member;
said member being generally tubular and surrounding said telescopically interconnected ends of said shaft sections;
said telescopic ends being constructed to provide a torque transmitting connection between said shaft sections and wherein the one end of said first shaft section forms a clearance fit in the recess of the one end of the second shaft section to allow limited relative rotation of two shaft sections when said torque transmitting deformable member does not transmit torque between the two steering shaft sections with said limited relative rotation being noticeable to the operator of a motor vehicle.

* * * * *